(12) United States Patent
Kumpfmüller

(10) Patent No.: US 11,872,842 B2
(45) Date of Patent: Jan. 16, 2024

(54) SOCKET SPANNER INSERT

(71) Applicant: Helmut Kumpfmüller, Laberweinting (DE)

(72) Inventor: Helmut Kumpfmüller, Laberweinting (DE)

( * ) Notice: Subject to any disclaimer, the term of this patent is extended or adjusted under 35 U.S.C. 154(b) by 260 days.

(21) Appl. No.: 17/598,713

(22) PCT Filed: Mar. 16, 2020

(86) PCT No.: PCT/DE2020/100193
§ 371 (c)(1),
(2) Date: Sep. 27, 2021

(87) PCT Pub. No.: WO2020/192835
PCT Pub. Date: Oct. 1, 2020

(65) Prior Publication Data
US 2022/0176741 A1  Jun. 9, 2022

(30) Foreign Application Priority Data
Mar. 28, 2019 (DE) ...................... 10 2019 108 019.3

(51) Int. Cl.
*B60B 29/00* (2006.01)
(52) U.S. Cl.
CPC ........ *B60B 29/003* (2013.01); *B60B 2340/12* (2013.01)
(58) Field of Classification Search
CPC ....... B25B 21/002; B25B 13/06; B25B 13/56; B25B 23/0014; B25B 23/0021; B60B 29/003; B60B 2340/12
See application file for complete search history.

(56) References Cited

U.S. PATENT DOCUMENTS

| | | | | |
|---|---|---|---|---|
| 4,836,067 A | * | 6/1989 | Rogers .................... | B25B 13/06 81/125 |
| 4,979,355 A | * | 12/1990 | Ulevich ................ | B25B 13/107 81/DIG. 11 |
| 5,009,133 A | * | 4/1991 | Carey ..................... | B25B 13/06 81/180.1 |
| 6,138,538 A | * | 10/2000 | Neijndorff ............ | B25B 23/005 81/DIG. 11 |
| D441,264 S | * | 5/2001 | Bruns .............................. | D8/29 |

(Continued)

FOREIGN PATENT DOCUMENTS

CN 201493787 U 6/2010
DE 202007012664 U1 11/2007
(Continued)

*Primary Examiner* — David B. Thomas
(74) *Attorney, Agent, or Firm* — McGlew and Tuttle, P.C.

(57) ABSTRACT

A socket spanner insert releases or fastens wheel bolts which in the mounted state rest inside wheel bolt holes of a car rim. The socket spanner insert includes a base body which has a screw head receptacle and a tool receptacle, and a sleeve which encompasses the base body at least in portions and is rotatably connected to the base body. In order to prevent damage to the rims when mounting and removing wheel bolts, a retaining element is provided which, during release or fastening of the wheel bolt, blocks a relative rotational movement of the sleeve with respect to the car rim and allows a rotation of the base body within the sleeve.

18 Claims, 3 Drawing Sheets

(56) References Cited

U.S. PATENT DOCUMENTS

| | | | | |
|---|---|---|---|---|
| 6,397,706 | B1 * | 6/2002 | Maznicki | ................ B25B 13/06 |
| | | | | 81/185 |
| 7,082,864 | B1 * | 8/2006 | Weber | ..................... B25B 13/56 |
| | | | | 81/492 |
| 9,925,649 | B2 * | 3/2018 | Wyckhouse | ............ B25B 23/00 |
| 10,675,739 | B2 * | 6/2020 | Miley | .................... B25B 23/12 |
| 2012/0279361 | A1 | 11/2012 | Huang | |
| 2016/0375563 | A1 | 12/2016 | Junkers et al. | |

FOREIGN PATENT DOCUMENTS

| | | |
|---|---|---|
| DE | 202017005554 U1 | 12/2017 |
| FR | 2921286 A1 | 3/2009 |
| WO | 9111294 A1 | 8/1991 |
| WO | 2014117306 A1 | 8/2014 |

* cited by examiner

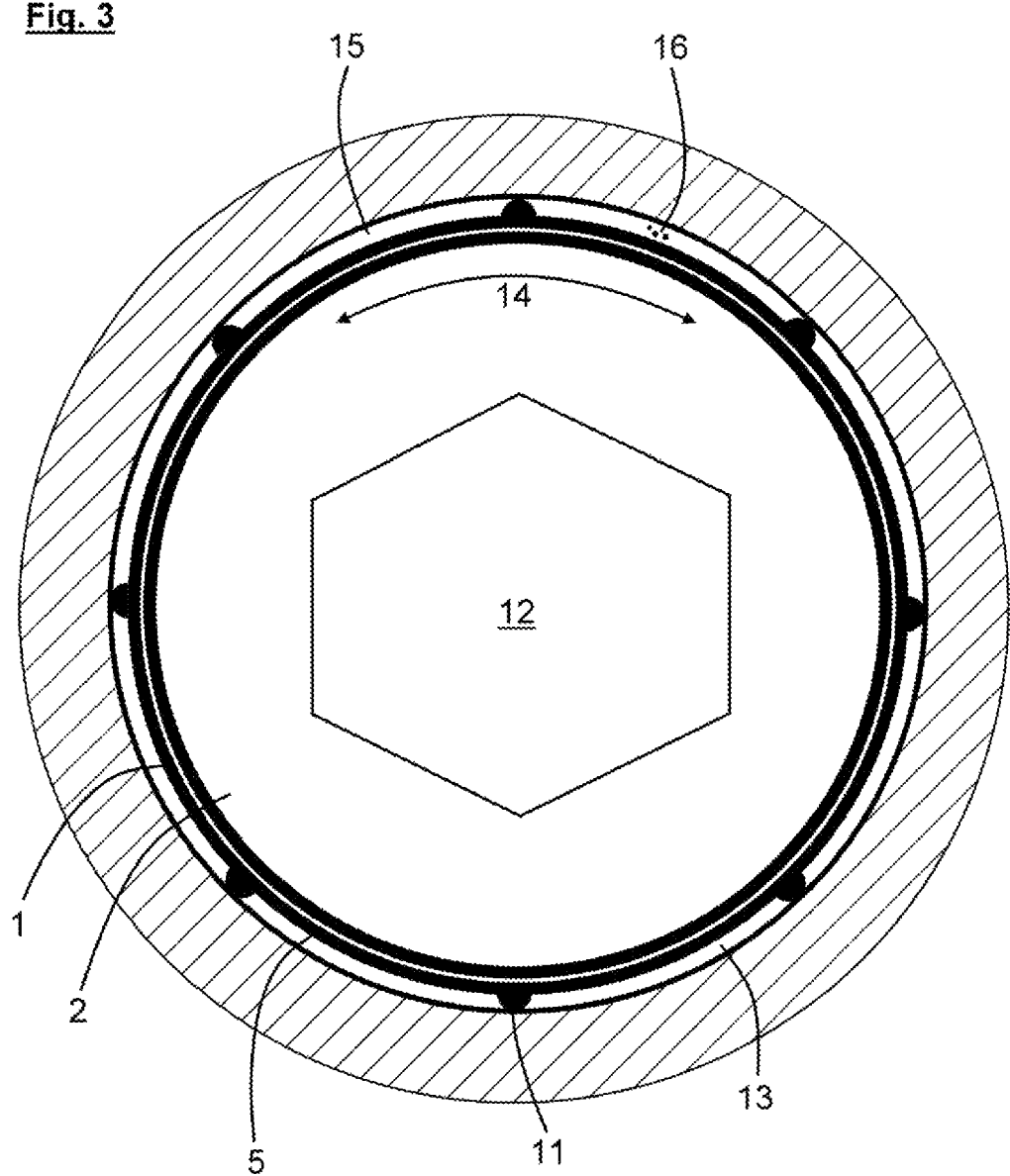

SOCKET SPANNER INSERT

CROSS REFERENCE TO RELATED APPLICATIONS

This application is a United States National Phase Application of International Application PCT/DE2020/100193, filed Mar. 16, 2020, and claims the benefit of priority under 35 U.S.C. § 119 of German Application 10 2019 108 019.3, filed Mar. 28, 2019, the entire contents of which are incorporated herein by reference.

TECHNICAL FIELD

The present invention relates to a socket spanner insert for releasing or fastening wheel bolts which in the mounted state rest inside wheel bolt holes of a car rim, comprising a base body which has a screw head receptacle and a tool receptacle, and a sleeve which encompasses the base body at least in portions and is rotatably connected to the base body.

TECHNICAL BACKGROUND

Socket spanner inserts of this kind are known according to the prior art and serve to mount and remove car wheels. For this purpose, the socket spanner inserts are first placed onto a suitable tool, such as an impact screwdriver. When removing a wheel, the screw head receptacle of the socket spanner insert is subsequently placed successively on the screw heads of the wheel bolts which rest inside wheel bolt holds and hold the car tire on the wheel carrier. The wheel bolts are released by means of an anti-clockwise rotation and can be removed from the relevant wheel bolt holes. As soon as all the wheel bolts of a rim are released, the wheel can be removed from the wheel carrier. In contrast, when mounting a wheel, the wheel bolts are inserted into the wheel bolt holes and tightened therein, for which purpose substantially the same method steps are carried out in the reverse sequence.

In both cases, i.e., when mounting a wheel and when removing a wheel, the socket spanner inserts rotate inside the wheel bolt holds at relatively high angular speeds, which often leads to scratching and other damage to the rim on account of small dirt particles inside the wheel bolt holes, such as fine sand, dust, or particles of winter road sand. In particular in the case of coated aluminum rims dirt, road salt and/or rim cleaners can penetrate the scratched and damaged paintwork, which can lead to extensive damage to the rim, up to aluminum attack.

According to the prior art, socket spanner inserts comprising rotatable sleeves are known, but these in each case have smooth surfaces and exhibit comparatively high friction with respect to the base bodies of the socket spanner inserts, such that the sleeves rotate together with the base bodies, which likewise leads to damage to the rims. Furthermore, in the case of socket spanner inserts of this kind some of the particles of dirt bind to the surface of the sleeve due to the action of force in the case of contact with the rim surface in the wheel bolt hole, as a result of which the use of said socket spanner inserts, associated with ingress of dirt at the sleeve, results in damage at the surface, even in the case of clean wheel bolt holes.

SUMMARY

Proceeding herefrom, an object of the present invention is that of providing a socket spanner insert which prevents damage to the rim both when mounting and when removing wheel bolts.

This object is achieved by the socket spanner insert according to the invention. At least one retaining element is provided which, during release or fastening of the wheel bolt, blocks a relative rotational movement of the sleeve with respect to the car rim and allows a rotation of the base body within the sleeve. As a result, relative movements between the sleeve and rim, in particular between the sleeve and wheel bolt hole, are prevented, such that scratching of the car rim is effectively prevented, both during mounting and also during removal of wheel bolts.

Preferred embodiments of the present invention are specified below.

According to a first preferred embodiment of the invention, a first retaining element has at least one contact element made of a resilient material, which element is formed on or fastened to the sleeve and establishes force-fitting contact of the sleeve at the side wall of the wheel bolt hole. In the simplest case, the sleeve has a complete sheathing made of a soft material, such as silicon, rubber, or the like, which increases the coefficient of friction between the sleeve and the car rim such that the base body can rotate inside the sleeve at any desired angular speed, without in the process bringing about a rotation of the sleeve relative to the rim. Rotation-related scratches on the rim can thus be effectively prevented.

As an alternative to a complete sheathing with resilient material, the contact element can alternatively be formed of a plurality of elevations which are arranged uniformly or non-uniformly on the sleeve and between which intermediate spaces are formed. In this case, the contact elements or the outer surfaces thereof are spaced sufficiently far from the surface of the rotatable sleeve that, in the case of mounting, force-fitting contact of the contact elements on the wheel bolt holes is established, and co-rotation of the sleeve is prevented. The intermediate spaces, present in this case, between the elevations receive any dirt particles which are deposited inside the wheel bolt holds, such that said dirt particles do not scratch or otherwise damage the rim during mounting of the car tire.

The elevations can be of substantially any geometry, wherein elevations which are configured so as to be conical, frustoconical, pyramidal, cylindrical, hollow-cylindrical, and/or prismatic have been found to be preferred. Elevations in the form of peripheral rings or ring segments are also possible. In this case, all the elevations of one socket spanner insert can be configured so as to be identical to one another or different from one another. In a cross-section radial to the sleeve surface, the elevations are preferably configured so as to be rectangular, trapezoidal, triangular and/or semi-circular. In a cross section tangential to the sleeve surface, said elevations are configured so as to be circular, rectangular and/or polygonal.

Alternatively, and/or in addition, the socket spanner insert can comprise a second retaining element which is formed by a connection element between the sleeve and the tool, and which establishes a releasable and rotationally fixed connection between the sleeve and the tool, such that a rotational movement of the sleeve with respect to the tool and/or the car rim is blocked, while the base body is rotatably mounted inside the sleeve. A connection element of this kind can be configured as an arm which
  a) is slidably or pivotably hinged to the sleeve or to the tool at a first end, and can be releasably connected, at the second end thereof, to the tool or to the sleeve, or
  b) can be releasably connected at both ends to the sleeve and to the tool.

In order to fasten the sleeve to the base body of the socket spanner insert, it is preferable for the base body to comprise at least one annular groove into which the sleeve engages by means of retaining profiles, such that the sleeve is arranged on the base body so as to be interlocking and so as to not be slidable in the longitudinal axial direction. In this case the annular groove is preferably arranged at the end of the socket spanner insert which is opposite the screw head receptacle. However, it is also possible for a plurality of annular grooves to be arranged along the base body surface, into which grooves retaining profiles of the sleeve engage in each case.

According to a further advantageous embodiment of the invention, thrust rings are arranged between the sleeve and the base body, which rings reduce to a minimum the contact surface between the sleeve and the base body, such that the frictional torque, and thus what is known as the breakaway torque, which counteracts free rotatability of the sleeve, is reduced.

Further preferred designs of the present invention, as well as specific embodiments, will be explained in the following, with reference to the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a cross sectional view of a socket spanner insert which has been placed on; and FIG. 3 is a cross sectional view of a socket spanner insert which has been placed on.

DESCRIPTION OF PREFERRED EMBODIMENTS

Figure 1:
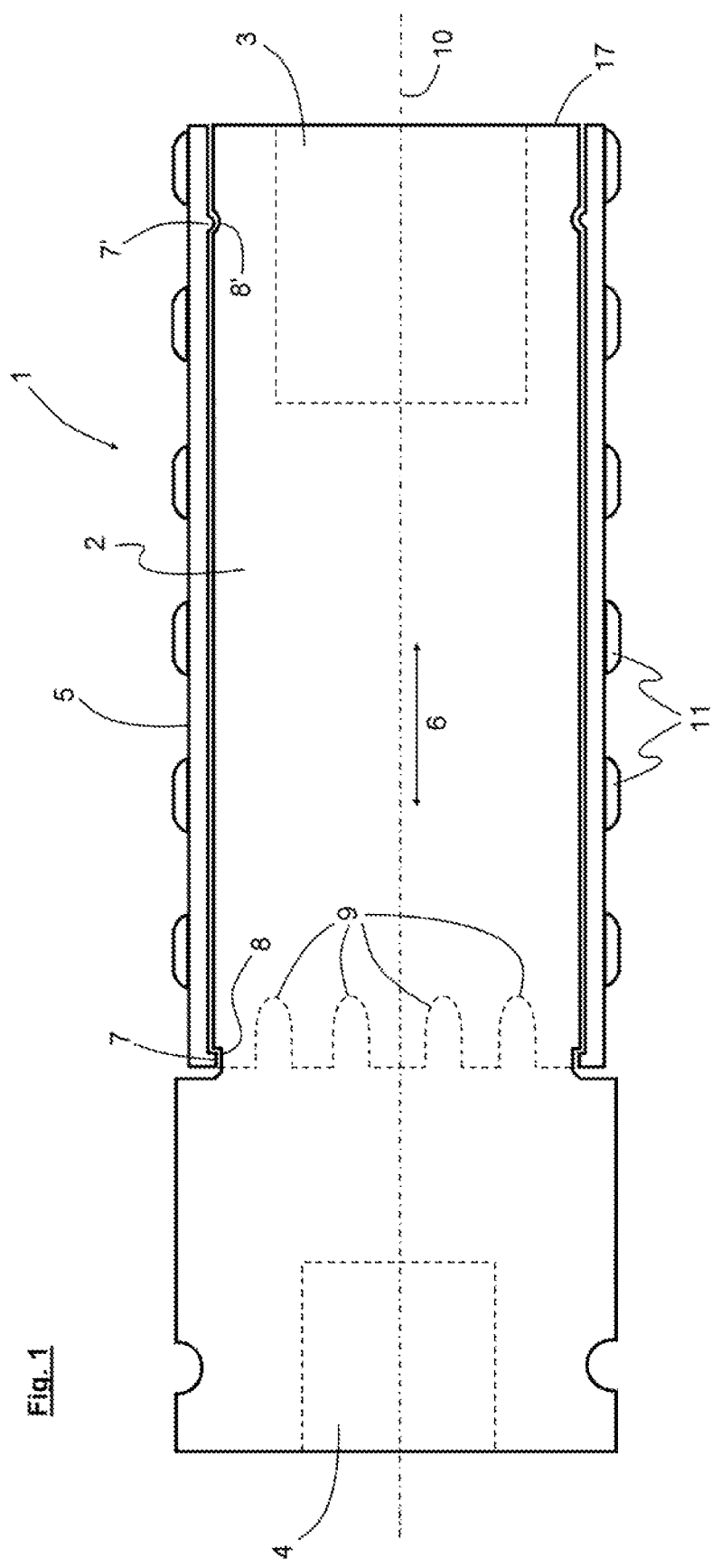
FIG. 1 is a cross sectional view of a socket spanner insert.

Referring to the drawings, FIG. 1 is a cross section of a socket spanner insert 1 comprising a base body 2 which comprises, at the end face, and opposite ends, a tool receptacle 4 and a screw head receptacle 3. The socket spanner insert 1 can be placed onto an impact screwdriver (not shown) by means of the tool receptacle 4, by means of which impact screwdriver wheel bolts can be released or tightened. The base body 2 is encompassed by a sleeve 5 which is rotatably connected to the base body 2. In contrast, in the longitudinal axial direction (arrow 6) the sleeve 5 is fastened on the base body 2 such that it cannot slide. For this purpose, the sleeve 5 comprises two retaining profiles 7 which engage into correspondingly configured grooves 8 on the base body 2. On the side remote from the end face 17 of the socket spanner insert 1, the annular retaining profile 7 is interrupted by slits 9 which allow for a certain amount of radial spreading of the sleeve 5 such that the sleeve 5 can be pushed onto the base body 2 without damage. In the mounted state (FIG. 1) of the socket spanner insert 1, the sleeve 5 is mounted so as to be freely rotatable about the longitudinal axis 10 of the base body 2. On the outside of the sleeve 5, retaining elements in the form of elevations 11 are provided, which elevations have a substantially trapezoidal cross section and are spaced apart from the sleeve surface. The elevations 11 shown consist of a soft material, in particular silicon, rubber or the like (a resilient material), and offer non-slip contact within a wheel bolt hole (not shown in FIG. 1).

Figure 2:
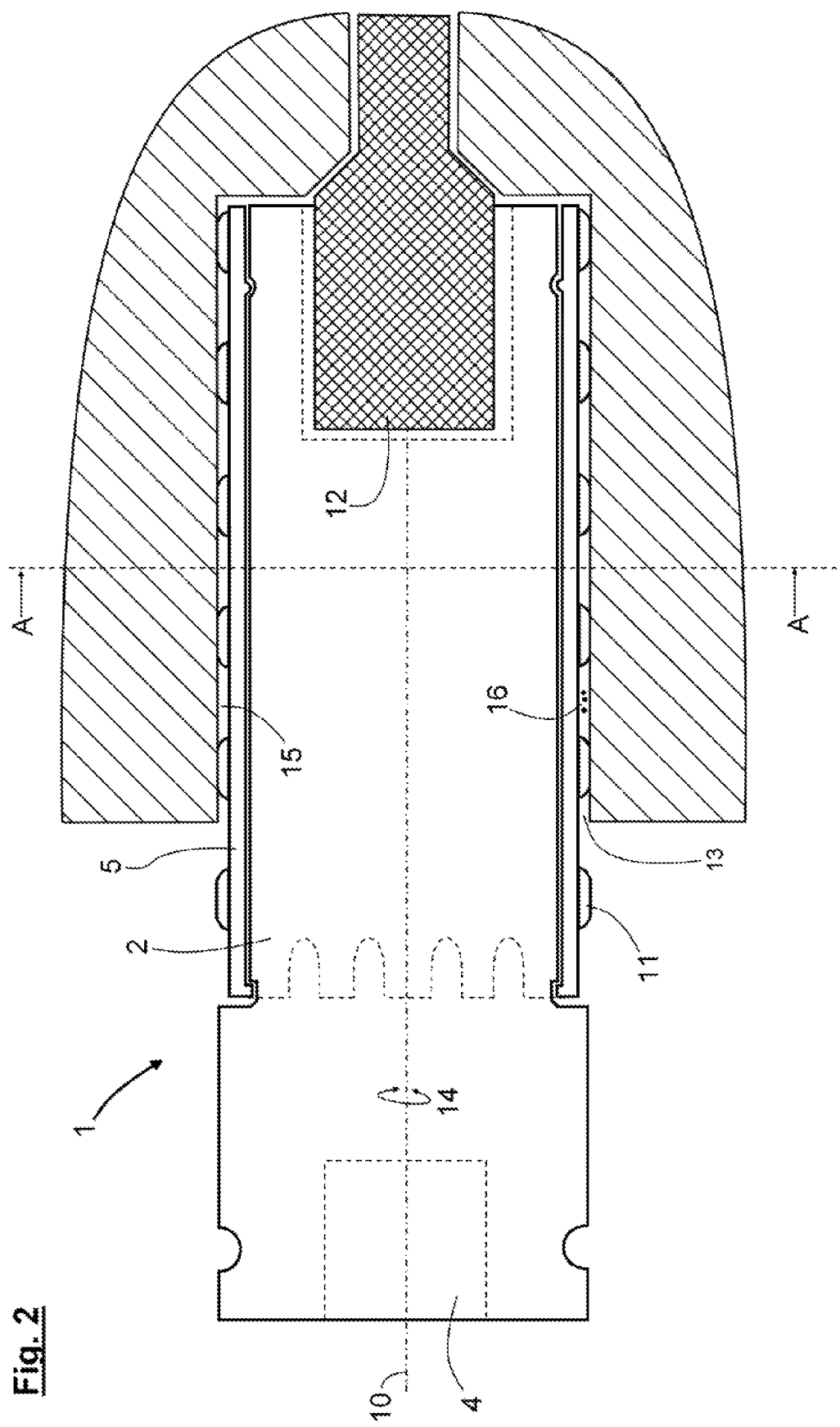

FIGS. 2 and 3 are different cross-sectional views of a socket spanner insert 1 placed onto a wheel bolt 12, inside a wheel bolt hole 13. FIG. 2 is a side view, while FIG. 3 is a plan view. The diameter of the sleeve 5 of the socket spanner insert 1 is dimensioned such that the elevations 11 have a sufficiently large contact surface at the wheel bolt hole 13, in the case of very narrow wheel bolt holes 13, to bring about force-fitting mounting of the sleeve 5 inside the wheel bolt hole 13 and to prevent a rotation of the sleeve 5 inside the wheel bolt hole 13. In contrast, the coefficient of friction between the base body 2 and the sleeve 5 is lower, such that the base body 1 is freely rotatable in the direction of the arrow 14, such that the wheel bolt 12 can be fastened therein or released. It can also be seen in FIGS. 2 and 3 that intermediate spaces 15 result between the elevations 11, which spaces serve to receive particles of dirt 16. The particles of dirt 16 accumulate in the intermediate spaces 15 and as a result do not scratch the inside surfaces of the wheel bolt holes 13.

FIG. 2 shows an embodiment in which the wheel bolt hole 13 has a comparatively small diameter, such that the elevations 11 rest directly on the inside walls of the wheel bolt holes 13. In contrast, in the case of larger wheel bolt holes 13, when removing the wheel bolts 12 there is initially not yet any contact with the rim surface within the wheel bolt hole 13. However, as soon as the wheel bolt 12 has been fully unscrewed from the thread using the impact screwdriver, the socket spanner insert 1 starts to rotate, usually eccentrically, together with the sleeve 5, which can lead to the sleeve 5 touching the rim surface inside the wheel bolt hole 13. In this case, the particularly shaped elevations 11 on the sleeve 5 bring about immediate braking of the sleeve 5, up to a standstill, such that in this case too damage of the rim due to scratching or the like is effectively prevented.

While specific embodiments of the invention have been shown and described in detail to illustrate the application of the principles of the invention, it will be understood that the invention may be embodied otherwise without departing from such principles.

LIST OF REFERENCE NUMBERS 1 socket spanner insert
2 base body
3 screw head receptacle
4 tool receptacle
5 sleeve
6 arrow
7, 7' retaining profile
8, 8' groove
9 slit
10 longitudinal axis
11 elevation
12 wheel bolt
13 wheel bolt hole
14 arrow direction
15 intermediate space
16 particles of dirt
17 end face

The invention claimed is:

1. A socket spanner insert for releasing or fastening wheel bolts which in the mounted state rest inside wheel bolt holes of a car rim, the socket spanner insert comprising:

a base body which has a screw head receptacle and a tool receptacle;

a sleeve which encompasses the base body at least in portions and is rotatably connected to the base body; and at least one retaining element which, during release or fastening of the wheel bolt, blocks a relative rotational movement of the sleeve with respect to the car rim and allows a rotation of the base body within the sleeve, wherein the at least one retaining element comprises a first retaining element comprising at least one contact element made of a resilient material, which element is formed on or fastened to the sleeve and establishes force-fitting contact of the sleeve at the side wall of the wheel bolt hole and wherein the contact element is formed of a plurality of elevations which are arranged uniformly or non-uniformly on the sleeve and between which intermediate spaces are formed.

2. A socket spanner insert according to claim 1, wherein the elevations are configured so as to be conical, frustoconical, pyramidal, cylindrical, hollow-cylindrical, and/or prismatic.

3. A socket spanner insert according to claim 2, wherein the elevations are configured so as to be rectangular, trapezoidal, triangular and/or semi-circular in a cross section radial to a sleeve surface of the sleeve.

4. A socket spanner insert according to claim 3, wherein the elevations are configured so as to be circular, rectangular and/or polygonal in a cross section tangential to the sleeve surface.

5. A socket spanner insert according to claim 2, wherein the elevations are configured so as to be circular, rectangular and/or polygonal in a cross section tangential to a sleeve surface of the sleeve.

6. A socket spanner insert according to claim 1, wherein the elevations are configured so as to be rectangular, trapezoidal, triangular and/or semi-circular in a cross section radial to a sleeve surface of the sleeve.

7. A socket spanner insert according to claim 1, the elevations are configured so as to be circular, rectangular and/or polygonal in a cross section tangential to a sleeve surface of the sleeve.

8. A socket spanner insert according to claim 1, further comprising a second retaining element that is formed by a connection element between the sleeve and the tool, which connection element establishes a releasable and rotationally fixed connection between the sleeve and the tool, such that a rotational movement of the sleeve with respect to the tool and/or the car rim is blocked, while the base body is rotatably mounted inside the sleeve.

9. A socket spanner insert according to claim 8, wherein the connection element is configured as an arm which:
is slidably or pivotably hinged to the sleeve or to the tool at a first end, and can be releasably connected, at the second end thereof, to the tool or to the sleeve; or
can be releasably connected at both ends to the sleeve and to the tool.

10. A socket spanner insert according to claim 1, wherein the base body comprises at least one annular groove into which the sleeve engages by means of retaining profiles, such that the sleeve is arranged on the base body so as to be interlocking and so as to not be slidable in the longitudinal axial direction.

11. A socket spanner insert according to claim 1, wherein thrust rings are arranged between the sleeve and the base body.

12. A socket spanner insert for releasing or fastening wheel bolts which in the mounted state rest inside wheel bolt holes of a car rim, the socket spanner insert comprising:

a base body which has a screw head receptacle and a tool receptacle;

a sleeve which encompasses the base body at least in portions and is rotatably connected to the base body;

a first retaining element which, during release or fastening of the wheel bolt, blocks a relative rotational movement of the sleeve with respect to the car rim and allows a rotation of the base body within the sleeve; and a second retaining element that is formed by a connection element between the sleeve and the tool, which connection element establishes a releasable and rotationally fixed connection between the sleeve and the tool, such that a rotational movement of the sleeve with respect to the tool and/or the car rim is blocked, while the base body is rotatably mounted inside the sleeve wherein the connection element is configured as an arm which:
is slidably or pivotably hinged to the sleeve or to the tool at a first end, and can be releasably connected, at the second end thereof, to the tool; or
to the sleeve, or can be releasably connected at both ends to the sleeve and to the tool.

13. A socket spanner insert according to claim 12, wherein the at least one retaining element comprises a first retaining element comprising at least one contact element made of a resilient material, which element is formed on or fastened to the sleeve and establishes force-fitting contact of the sleeve at the side wall of the wheel bolt hole.

14. A socket spanner insert according to claim 12, wherein the elevations are configured so as to be conical, frustoconical, pyramidal, cylindrical, hollow-cylindrical, and/or prismatic.

15. A socket spanner insert according to claim 14, wherein the elevations are configured so as to be rectangular, trapezoidal, triangular and/or semi-circular in a cross section radial to a sleeve surface of the sleeve.

16. A socket insert according to claim 12, the elevations are configured so as to be circular, rectangular and/or polygonal in a cross section tangential to a sleeve surface of the sleeve.

17. A socket spanner insert according to claim 12, wherein the base body comprises at least one annular groove into which the sleeve engages by means of retaining profiles, such that the sleeve is arranged on the base body so as to be interlocking and so as to not be slidable in the longitudinal axial direction.

18. A socket spanner insert according to claim 12, wherein thrust rings are arranged between the sleeve and the base body.

* * * * *